(12) United States Patent
Zimmer et al.

(10) Patent No.: US 7,841,128 B1
(45) Date of Patent: Nov. 30, 2010

(54) FISHING FLOAT

(75) Inventors: Michael A. Zimmer, Auburn, WA (US); Robert D. Buchanan, Auburn, WA (US)

(73) Assignee: Source Management Investments, LLC, Auburn, WA (US)

( * ) Notice: Subject to any disclaimer, the term of this patent is extended or adjusted under 35 U.S.C. 154(b) by 0 days.

(21) Appl. No.: 11/933,254

(22) Filed: Oct. 31, 2007

(51) Int. Cl.
*A01K 95/00* (2006.01)

(52) U.S. Cl. .................... 43/44.9; 43/44.91; 43/4.5

(58) Field of Classification Search ............ None
See application file for complete search history.

(56) References Cited

U.S. PATENT DOCUMENTS

| | | | | |
|---|---|---|---|---|
| 86,786 | A * | 2/1869 | Tellgmann | 43/44.9 |
| 2,167,334 | A * | 7/1939 | Hayes | 43/42.06 |
| 2,836,001 | A * | 5/1958 | Silen | 43/42.06 |
| 2,957,266 | A * | 10/1960 | Pfister | 43/44.88 |
| 3,782,025 | A * | 1/1974 | Kochevar | 43/44.9 |
| 3,967,407 | A * | 7/1976 | Halbasch | 43/44.9 |
| 4,418,492 | A * | 12/1983 | Rayburn | 43/44.9 |
| 5,165,195 | A * | 11/1992 | Matsui | 43/43.1 |
| 5,233,785 | A * | 8/1993 | Ching | 43/42.05 |
| 5,388,368 | A * | 2/1995 | Lawrence | 43/44.9 |
| 6,874,271 | B2 * | 4/2005 | Lieb | 43/43.13 |
| 7,475,510 | B2 * | 1/2009 | Franklin | 43/44.91 |
| 2004/0016172 | A1 * | 1/2004 | Sims | 43/42.06 |

* cited by examiner

*Primary Examiner*—Christopher P Ellis
(74) *Attorney, Agent, or Firm*—DWC Law Firm, P.S.

(57) ABSTRACT

Various embodiments of a fishing float are provided. The fishing float has an internal axial passageway for use when a slip-type configuration for the float is desired, and a plurality of divergent passageways for use when a fixed-type configuration for the float is desired.

5 Claims, 2 Drawing Sheets

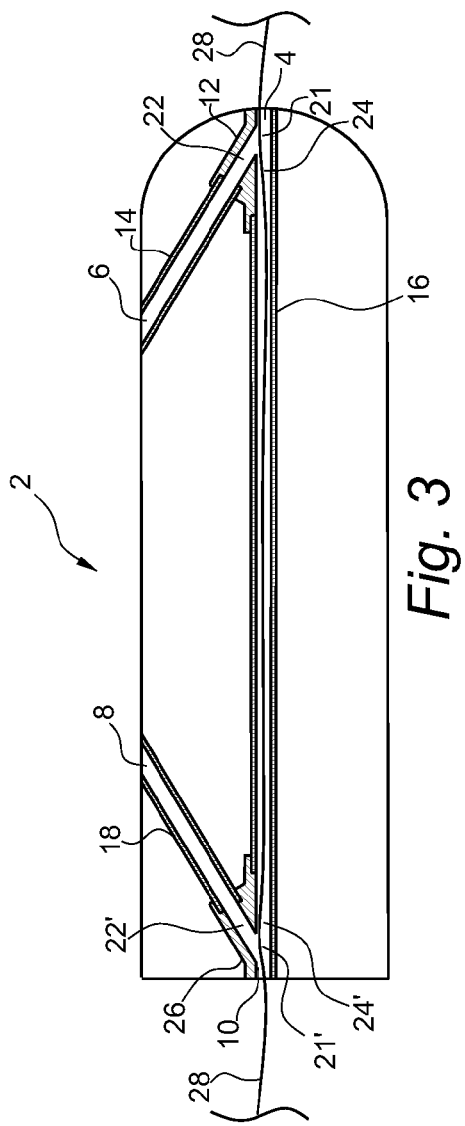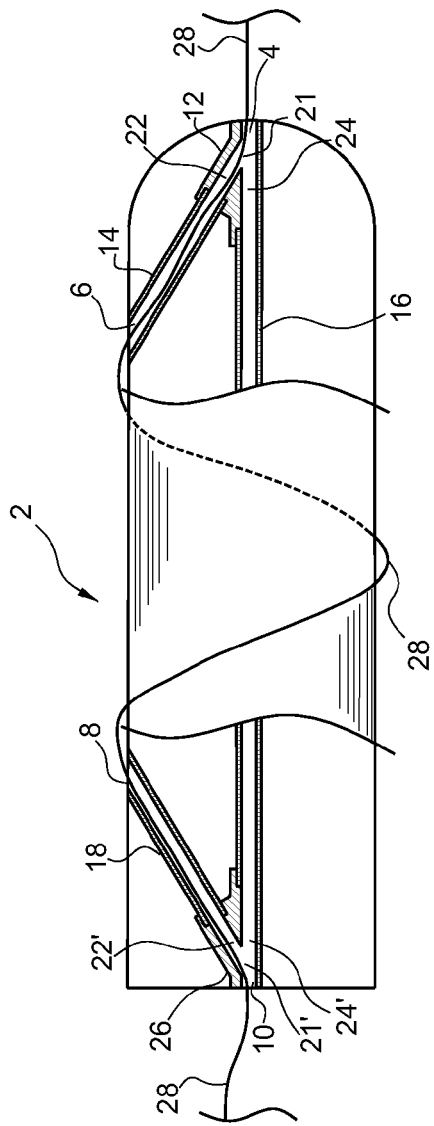

FISHING FLOAT

BACKGROUND OF THE INVENTION

1. Field of the Invention

The present invention relates generally to fishing floats, and in particular, to "dink" type fishing floats that can be conveniently rigged in either slip-type configuration or fixed-type configuration.

2. Description of Related Art

A variety of fishing floats are currently available. For example, in recreational fishing for steelhead or salmon, "dink" floats are commonly used, which typically comprise tube-like foam floats. Dink floats can be rigged as slip-type floats that are mountable to a fishing line in a way that enables the line to slide or move relative to the float. As such, the float can remain near the water surface as the line depth below the water can change by slipping through the float. Slip-type dink floats are typically used by threading a fishing line through an opening into an axial passageway of the float extending from one end portion of the float (e.g., the top) to another end portion (e.g., the bottom). The travel of the line through the float can be controlled by a stop that is configured to be larger than the passageway. The stop can be, for example, a bobber-stop, knot, or other mass, in or connected to the line, on an opposite side of the float than the lure. When casting the line, the float can rest near the end of the line for ease in casting, and after being cast, the line can "slip" through the float to a desired depth, controlled by the stop.

In other instances, users prefer to rig dink floats in a fixed-type configuration. This eliminates a need for a stop in the line. That is, the fishing line is connected to the float in a manner that fixes the line relative to the float. Example uses of fixed floats are in shallow water fishing where it is desired to "jiggle" a bait device within a particular zone, without moving the bait device (e.g., lure or fly) out of the zone. When a user attempts to jiggle a bait device in a slip-type configuration, it can typically result in too much movement to the bait device whereby the line "slips" and the bait device is moved out of a particular zone desired by user, whereas a fixed-type configuration allows a user to more easily control the position of the bait device as it is fixed to the float.

For currently available dink floats, it is often inconvenient to alternate between the two types of rigging, slip and fixed, when necessary.

BRIEF SUMMARY

In some embodiments of the present invention, a fishing float is provided having an elongated buoyant body with a first end portion and a second end portion. A first end opening can be located on the first end portion, and a second end opening can be located on the second end portion. A first splitter having an entrance passageway open to the first end opening is provided within the buoyant body. The first splitter can also have a plurality of additional passageways that diverge from one another. A second splitter having an entrance passageway open to the second end opening is provided within the buoyant body also. The second splitter can also have a plurality of additional passageways that diverge from one another.

Additionally, an axial conduit is provided within the buoyant body, having an axial passageway extending from at least one of the additional passageways of the first splitter to at least one of the additional passageways of the second splitter, the axial passageway extending in substantially axial manner along the length of the elongated buoyant body.

A plurality of side conduits are also provided, with each side conduit extending generally outwardly from at least one of the additional passageways of the first splitter and second splitter, each of the side conduits being oriented such that an axis of the side conduit diverges away from an axis of the axial passageway at an angle of less than 90 degrees. Each of the side conduits leads to a side opening on the side of the buoyant body of the float.

A fishing line can be threaded through the first opening, through the axial passageway, and out the second opening, to provide a slip-type rig for the float. Alternatively, the fishing line can be threaded through the first opening, through one of the side conduits, and out a side opening, then wrapped about the fishing float one or more times before being threaded into a second side opening, then into a second side conduit, and out the second opening, to provide a fixed-type rig for the float.

BRIEF DESCRIPTION OF SEVERAL VIEWS OF THE DRAWINGS

FIG. 3 is a cross sectional side elevation view of the float of FIG. 1 with a fishing line extending through the slip passage.

FIG. 4 is a cross sectional side elevation view of the float of FIG. 1 with a fishing line extending through the side passages and wrapped around the float.

DETAILED DESCRIPTION OF PREFERRED EMBODIMENTS OF THE INVENTION

In the following description, certain specific details are set forth in order to provide a thorough understanding of various embodiments of the invention. However, upon reviewing this disclosure, one skilled in the art will understand that the invention may be practiced without many of these details. In other instances, well-known or widely available structures associated with fishing floats have not been described in detail to avoid unnecessarily obscuring the descriptions of the embodiments of the invention.

Figure 1:
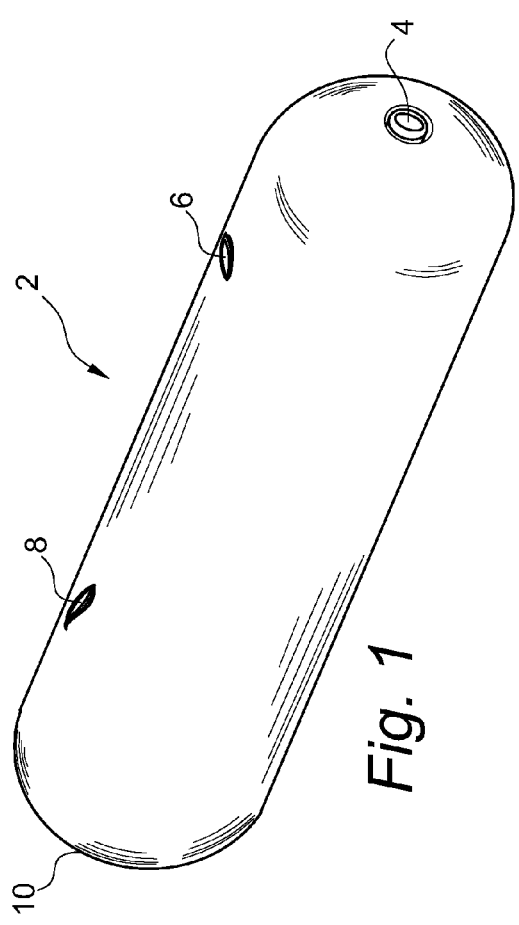
FIG. 1 is a perspective view of an embodiment of the present invention of the float.

Referring to FIG. 1, in some embodiments of the present invention, a "dink" float 2 (or "float") is provided having at least four (4) openings, 4, 6, 8 and 10. In FIG. 1, a first end opening 4 can be seen, but a second end opening 10, located on an opposite end portion of the float 2, is obscured. In addition, two side openings 6, 8 are visible in FIG. 1.

Figure 2:
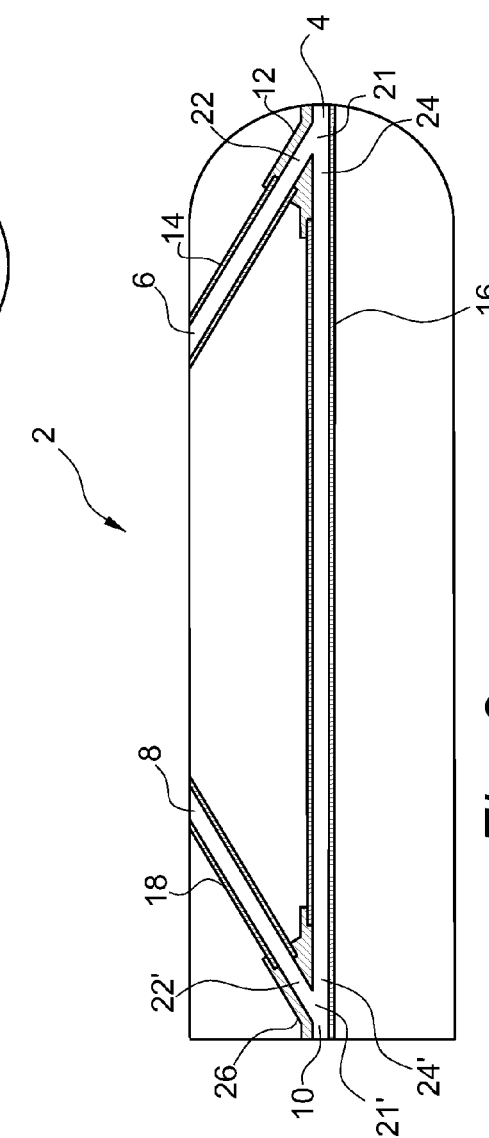
FIG. 2 is a cross sectional side elevation view of the float of FIG. 1.

Now, referring to FIG. 2, the first end opening 4 leads to a passage within a first splitter socket 12. The splitter socket 12 is provided within the float 2, and comprises an entrance passageway 21, leading to two divergent passageways, 22 & 24. Axial passageway 24 extends in a generally axial direction, and diverging passageway 22 extends at an angle away from the axis of the float. A second splitter socket 26 is provided at an opposite (second) end portion of the float 2 within the float. The second end opening 10 leads to an entrance passageway 21' within the second splitter socket 26. Like the first splitter socket 12, the entrance passageway 21' of the second splitter socket 26 also diverges into two separate passageways comprised of an axial passageway 24' and a diverging passageway 22'.

As shown in FIG. 2, an axial conduit 16, which can be tubular in shape, is connected to the first splitter socket 12 and second splitter socket 26 in alignment with the axial passageways 24, 24'. The axial conduit 16 can have a hollow interior to provide a slip passage for a fishing line that is threaded through the first end opening 4 and out the second end opening 10, through the axial conduit 16.

In addition, in the embodiment shown in FIG. 2, side conduits 14, 18 are provided, which can each be tubular in shape, having hollow interiors providing passageways that run along the length of the side conduits. The side conduits 14, 18 are connected to the divergent portions of the splitter sockets 12, 26, and the passageways of the side conduits 14, 18 extend the divergent passageways 22, 22' to openings 6, 8, located on side portions of the float 2.

Referring to FIG. 3, a fishing line 28 can be threaded through first end opening 4, through axial conduit 16, and out second end opening 10. When the fishing line 28 is threaded in such manner, the float can be used as a slip float, as the fishing line is free to travel within the axial conduit 16, subject to a stop. A stop can be positioned on the fishing line to limit the maximum travel of the fishing line through the slip float, as will be appreciated by one skilled in the art after reviewing this disclosure.

Referring to FIG. 4, alternatively, a fishing line 28 can be threaded through first end opening 4, through the side conduit 14, out side opening 6, and then wrapped around the float 2 as illustrated in FIG. 4, before being threaded into side opening 8, through side conduit 18 and out second end opening 10. In the illustrated embodiment in FIG. 4, the fishing line 28 is wrapped around the float 2 one (1) time, after exiting the side opening 4, before being threaded back into side opening 8. However, as will be appreciated by those skilled in the art, the fishing line 26 can be wrapped around the float multiple times to help further fix the line in place. The dink float can be foam and when the fishing line is wrapped around the float 2 and the line is pulled taut, such as by a weight dangling from the line, the wrapped line can naturally tighten around the float to cause the line to compress into the float, and fix against the float, thereby providing a fixed-type rig on dink float 2. In some embodiments, the dink float is made of high-density EVA foam. In other embodiments, the dink float is made of other materials, such as, for example, lower density foam.

Although specific embodiments and examples of the invention have been described supra for illustrative purposes, various equivalent modifications can be made without departing from the spirit and scope of the invention, as will be recognized by those skilled in the relevant art after reviewing the present disclosure. The various embodiments described can be combined to provide further embodiments. The described devices and methods can omit some elements or acts, can add other elements or acts, or can combine the elements or execute the acts in a different order than that illustrated, to achieve various advantages of the invention. These and other changes can be made to the invention in light of the above detailed description.

In general, in the following claims, the terms used should not be construed to limit the invention to the specific embodiments disclosed in the specification. Accordingly, the invention is not limited by the disclosure, but instead its scope is determined entirely by the following claims.

What is claimed is:

1. A fishing float comprising:
an elongated buoyant body having a first end portion and a second end portion;
a first end opening located on the first end portion;
a second end opening located on the second end portion;
a first splitter having an entrance passageway open to the first end opening, and a plurality of additional passageways that diverge from one another;
a second splitter having an entrance passageway open to the second end opening, and a plurality of additional passageways that diverge from one another;
an axial conduit having an axial passageway extending from at least one of the additional passageways of the first splitter to at least one of the additional passageways of the second splitter, the axial passageway extending in substantially axial manner along the length of the elongated buoyant body; and
a plurality of side conduits each extending from at least one of the additional passageways of the first splitter and second splitter, each of the side conduits being oriented such that an axis of the side conduit diverges away from an axis of the axial passageway at an angle of less than 90 degrees, wherein at least one of the splitters has a plurality of connection flanges, at least one of the connection flanges being capable of receiving an end portion of a side conduit concentrically within the connection flange, and at least one of the connection flanges being capable of receiving an end portion of the axial conduit concentrically within the connection flange.

2. The fishing float of claim 1 wherein each of the passageways have enclosed sidewalls.

3. The fishing float of claim 1 wherein the first splitter has at least a one axial passageway.

4. The fishing float of claim 1 wherein each of the side conduits are angled inward toward a central portion of the float.

5. The fishing float of claim 1 wherein the elongated buoyant body is comprised of high density EVA foam.

\* \* \* \* \*